Patented Feb. 19, 1952

2,586,233

UNITED STATES PATENT OFFICE 2,586,233

SULFONAMIDO ALPHA AROYLAMINO DERIVATIVES OF ANTHRAQUINONE COMPOUNDS

Walter Kern, Sissach, Paul Sutter, Binningen, and Theodor Holbro, Basel, Switzerland, assignors to Ciba Limited, Basel, Switzerland No Drawing. Application July 8, 1947, Serial No. 759,698. In Switzerland July 11, 1946

13 Claims. (Cl. 260—316)

Many vat dyestuffs are known which contain acylamino groups. As acyl radicals commonly benzoyl radicals are present in these dyestuffs. Thus for example 1:4 and 1:5-di(benzoylamino)-anthraquinone are well known commercial products. Benzoylamino radicals are often found also in vat dyestuffs of the anthrimide-carbazole type. It has also been proposed to prepare vat dyestuffs containing benzoylamino groups which carry substituents in the benzene radical. In view of the known properties a vat dyestuff should have, viz. insolubility in water (if not reduced to the leuco stage) and resistance to severe wet treatments, the range of substituents which are permissible therein is rather restricted and therefore comparatively few vat dyestuffs are known in the art which contain acylamino groups substituted in the acyl radical.

It is an object of the present invention to provide new vat dyestuffs of the type which contains acylamino groups, wherein the acyl radical contains a substituent, the presence of which should be regarded as unsuitable because of its general chemical behaviour. Further objects will appear as the specification proceeds.

The present process provides for the preparation of vat dyestuffs by known methods wherein at least one process step an acylating agent is caused to react with a vattable amine if, as at least one acylating agent, there is used a carboxylic acid or a functional derivative thereof, which contain a sulfonic acid amide group.

As vattable amines which may be used as starting materials for the present process, there may be employed, for example, aminoanthraquinones as well as compounds with a higher condensed vattable ring system derived from anthraquinone. Among the aminoanthraquinones, α-aminoanthraquinones, like 1-aminoanthraquinone, 1:4- and 1:5-diaminoanthraquinones, and also aminoanthraquinones containing acylamino groups, like 1-amino-4-, or -5-, or -8-benzoylaminoanthraquinone, may be specially mentioned. These compounds may contain further substituents, as are usually present in vat dyestuffs, like alkoxy groups, especially methoxy groups, halogen atoms, like chlorine or bromine. Of the compounds with higher condensed ring systems, i. e. those having more than three condensed rings, aminodibenzanthrones, aminoanthraquinone- acridones, aminothiazolanthrones, -pyrazolanthrones, -anthrapyrimidines as well as aminoanthrimide-carbazoles may be mentioned. Furthermore, there may also be used amines which have more than one, for instance two, vattable radicals. Such radicals may be linked to one another by suitable bridge members, for instance nitrogen containing ones, like imino- or carboxylic acid amide groups, in certain cases also with inserted hydrocarbon radicals which may or may not be vattable, such as, for example, amino-di-anthrimides and amino-poly-anthrimides, and other compounds mentioned below.

According to the present process, such amines are acylated in at least one process step with carboxylic acids or their functional derivatives which contain a sulfonic acid amide group. Carboxylic acids of the aromatic series, for instance benzoic or naphthoic acids which in the aromatic nucleus carry a sulfamide group with a sulfur atom linked to the aromatic nucleus, are used to advantage. In all instances the said carboxylic acids may contain additional substituents normally occurring in vat dyestuffs. In the sulfamide group mentioned, the hydrogen atoms may be substituted wholly or partly by organic radicals, for instance by suitable hydrocarbon radicals such as alkyl radicals (for example, methyl, propyl, isopropyl, butyl or cyclohexyl radicals) or aryl radicals (for example of the phenyl series, such as phenyl or tolyl radicals). Radicals containing not more than 7 carbon atoms are preferred. There may be mentioned as acylating agents, for instance, benzene-1-carboxylic acid-4-sulfamide, benzene-1-carboxylic acid-4-(N-dimethyl)-sulfamide, -4-(diethyl)-sulfamide, -4-(N-methyl-N-phenyl)-phenyl-sulfamide, -4-(N-phenyl)-sulfamide, as well as the corresponding isomeric compounds, for instance the 1:3-derivatives, as well as substitution products of the said acids, such as 2-chloro- or 2-bromo-benzene-1-carboxylic acid-4-sulfamide and its N-substitution products. Especially valuable results are in many cases obtained by the use of N-dialkyl-sulfamido-benzene-carboxylic acids, particularly of those whose sulfamide group stands in para-position to the carboxyl group, and wherein the alkyl groups have up to 4 carbon atoms.

The term "sulfamide" or "sulfonic acid amide" as used in the present specification and claims, is to be taken in its broad sense and includes compounds with grouping such as

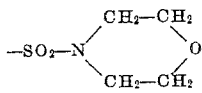

and

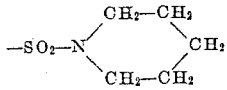

wherein two alkyl groups attached to the nitrogen atom form a ring of which the nitrogen atom is a member. However, the said term does not include groupings wherein, besides the —SO₂- group, a further acyl radical is attached to the sulfamide nitrogen, e. g. groupings of the type

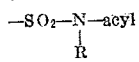

wherein R is a hydrocarbon radical, as the latter should correctly be termed acid imides and not amides. It is furthermore to be understood that compounds of the ammonium type wherein the nitrogen atom of the sulfamide group is more than trivalent are not included in the said term.

Rather than using the carboxylic acids as such, it is often appropriate to use them in the form of their functional derivatives, for instance acid halides, especially acid chlorides which are obtainable in known manner from the corresponding carboxylic acids, for example by the action of thionylchloride.

Generally known methods may be employed for the reaction of the vattable amines with the acylating agents. The starting materials are suitably caused to react with one another in an inert solvent or dispersing agent. The reaction generally going on easily at raised temperature, solvents with a relatively high boiling point are advantageously used, such as chloro-benzene, ortho-dichlorobenzene, or naphthalene and the reaction is carried out wholly or at least partly at a high temperature, for instance at the boiling point of the solvent used.

Depending upon the type and character of the starting materials employed or the vat dye to be prepared, it is sometimes possible to react the vattable amines with the acylating agents named, as the last step of the process. This is the case especially when a dyestuff of relatively simple structure is to be made and when the vattable amine employed as starting material already contains the other substituents desired for the finished dyestuff molecule. Thus, the present process permits of the direct conversion into a vat dyestuff of 1:4-diaminoanthraquinone by the reaction with 2 mols of a benzene-sulfamide-carboxylic acid chloride or of 1-amino-4- or -5-benzoylaminoanthraquinone or -4-aminoanthraquinone-2:1-(N)-benzacridone by reaction with 1 mol of such an acid chloride. It is also possible to produce the same dyestuffs by acylating an appropriate amino by means of a sulfamide-carboxylic acid in an earlier process step, for instance when, according to the present process 1-amino-4- or -5-nitroanthraquinone is acylated with a sulfamide-carboxylic acid, the nitro group is reduced to an amino group and afterwards benzoylation is effected. In similar manner, a suitable 4-amino-1-arylaminoanthraquinone, capable of closing the acridone ring in 1:2-position may be first acylated according to the present process with a sulfamide-carboxylic acid and acridone ring-closure brought about thereafter. If the various reaction steps follow this order of succession, intermediate products for the manufacture of vat dyes are in some cases obtained as a direct effect of the action of the acylating agents named on the vattable amines, such intermediate products being convertible into the final vat dyes by the introduction of further substituents or by treatment with condensing agents.

If vat dyes of comparatively complicated structure are to be made according to the present process, it is often advisable to attend to the acylation of the vattable amines one, two or several steps before the entire dyestuff molecule is finally built up. The process steps following the acylation are in themselves known in the preparation of vat dyes. There follow here a few examples of such measures: Reaction of vattable amines with compounds carrying a reactive substituent, like mono- and polyhalogenaryls, mono- and dicarbonic acid chlorides, phosgene and cyanuric chloride.

In this connection, the compound carrying a reactive substituent may itself be vattable or not vattable. In many cases the reaction of vattable compounds carrying a reactive substituent may just as easily be carried out with the corresponding arylamines or carboxylic acid amides. In addition to such condensation reactions which already effect a link between two vattable radicals or of a vattable one with one not vattable, another condensation, effecting inner ring closure, is in many cases possible, for instance a carbazolation or the formation of an azole ring.

Even when such or similar measures are taken to build up rather complicated dyestuffs, it is in many cases possible and in individual cases even appropriate, to make the acylation according to the present invention the last step of the process. Thus, in the case of anthrimides and anthrimide-carbazoles as well as in similar cases, the acylation of amino groups with carboxylic acids which contain sulfamide groups can be carried out before or after the combining or carbazolation reaction, if so desired or warranted by circumstances.

Within the very wide field of possibilities available according to the present invention there is a group of dyestuffs of comparatively simple structure which appear to be of special value, viz 1:4-diacylaminoanthraquinones containing as at least one acyl radical the radical of a benzene-1-carboxylic acid-4-sulfonamide.

In the above mentioned starting materials the sulphonamide group may with advantage be substituted at the nitrogen atom, and preferably disubstituted. As such sulphonamide groups there come into consideration, for example, N-arylalkyl-sulphonamide groups such as the phenylmethyl-sulphonamide group, diaralkyl-sulphonamide groups, such as the dibenzyl-sulphonamide group, and principally dialkyl-sulphonamide groups such as dimethyl-, diethyl-, or diallyl-sulphonamide groups, and also N-disubstituted sulphonamide groups in which the nitrogen atom forms part of a ring as, for example, in the case of sulphopiperidides and sulphomorpholines,

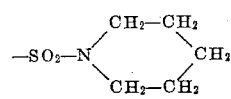

and

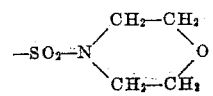

In these products which may be represented as 1-acylamino-4-(p-sulfonamido-)benzoylaminoanthraquinones the acyl radical attached to the amino group in 1-position may be acyl groups of aromatic character such as cinnamoyl groups and advantageously aroyl groups such as naphthoyl groups or benzoyl groups, of which the aromatic nuclei may contain substituents. It appears to be preferable not to insert the same p-sulfonamidobenzoyl radical into both amino groups in 1- and 4-positions.

As substituents in the said aromatic nuclei there come into consideration those which are usually present in vat dyestuffs and which are not detrimental to the usefulness of the resulting products as vat dyestuffs. As examples of suitable substituents there may be mentioned alkyl groups especially methyl groups, alkoxy groups especially ethoxy and methoxy groups, aryloxy groups especially phenoxy groups, alkyl-sulphone groups, aryl-sulphone groups, and sulphamido-groups which contain other substituents than those in the other sulphonamido-group in the molecule, and also halogen atoms such as chlorine, bromine or fluorine atoms, furthermore fused-on rings.

The said 1:4-diacylamino anthraquinones may be free from further substituents in the anthraquinone nucleus or may contain such further substituents as are permissible in vat dyestuffs. In many instances a substitution of a beta-position in the ring marked II of the anthraquinone skeleton in dyestuffs of the general formula

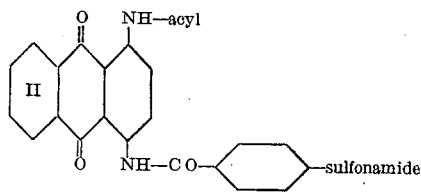

appears to have a beneficial effect.

The products obtained according to the present invention are valuable vat dyestuffs. They may be used in known manner for the dyeing and especially the printing of the most varied types of animal and especially vegetable fibers, such as wool, silk, and especially cotton, linen, rayon and staple fiber made from regenerated cellulose, as well as for superpolyamide fibers. Some of the dyeings obtained are very pure and their fastness to washing, chlorine and kier-boiling is especially surprising in view of the sulfamide group present in the dyestuff molecule. The dyestuffs may also be converted into the corresponding leuco-sulfuric acid esters in known manner, for instance through the action of agents yielding $SO_3$ in presence of metals, and then be used for dyeing or printing.

The following examples illustrate the invention, the parts being by weight unless otherwise stated:

Example 1

3.45 parts of benzene-1-carboxylic acid-4-(N-dimethyl)-sulfamide are dispersed in 130 parts of anhydrous ortho-dichlorobenzene and after addition of 13 parts of thionylchloride and a small quantity of pyridine, the mixture is stirred, first for half an hour at 80–90° C., and then for a quarter of an hour at 100–110° C. The excess of thionyl chloride and some ortho-dichlorobenzene are distilled off, advantageously in vacuo and 5.15 parts of 1-amino-4-benzoylaminoanthraquinone are added at a temperature of 100° C. and the whole is stirred at 170–175° C. for two hours and at the boil for another 15 minutes. After cooling the separated 1-(4'-N-dimethylsulfamide-benzoylamino)-4-benzoylaminoanthraquinone is filtered off, washed with alcohol and dried. The dyestuff of the formula

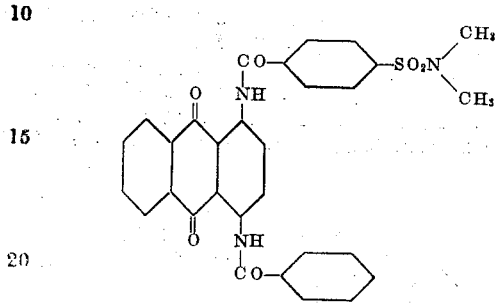

is obtained in very good yield, consists of red crystals melting at 338–341° C., and dissolving in concentrated sulfuric acid to give a red coloration and dyes cotton from a blue-violet vat in very fast tints which become bright pink after soaping.

Especially pure dyeings are obtained if a paste is made of the dyestuff by dissolving it in sulfuric acid or in hot pyridine and precipitation with water. The dyestuff can be used for printing according to customary processes, as the potash process, for instance.

By the reaction of 1-amino-4-benzoylaminoanthraquinone with sulfamidearyl-carboxylic acids named in the following table and by working as prescribed in the first paragraph hereof, dyestuffs of the following properties are obtained.

| Sulfamidearyl-carboxylic acid | Dyestuff Color—$H_2SO_4$ | Dyeing on cotton after soaping |
|---|---|---|
| (a) Benzene-1-carboxylic acid-3-(N-dimethyl)-sulfamide. | red | red. |
| (b) Benzene-1-carboxylic acid-4-(N-phenyl)-sulfamide. | do | pink. |
| (c) Benzene-1-carboxylic acid-4-(N-methylphenyl)-sulfamide. | do | red. |
| (d) Benzene-1-carboxylic acid-4-(N-methyl)-sulfamide. | do | bluish pink. |
| (e) Benzene-1-carboxylic acid-4-(N-ethyl)-sulfamide. | do | orange-red. |
| (f) Benzene-1-carboxylic acid-4-(N-diethyl)-sulfamide. | do | orange-red. |
| (g) Benzene-1-carboxylic acid-4-sulfamide. | red-brown | bluish-pink |
| (h) 2-Chlorobenzene-1-carboxylic acid-4-(N-dimethyl)-sulfamide. | red | red. |
| (i) Naphthalene-2-carboxylic acid-5-(N-dimethyl)-sulfamide. | do | Do. |

The benzene-1-carboxylic acid-4-(N-dimethyl)-sulfamide may be obtained by methylating benzoic acid-4-sulfamide with dimethylsulfate in phenolphthalein-alkaline solution or in the manner described in the following paragraph:

44 parts of benzoic acid-4-sulfochloride are stirred for two and a half hours with 210 parts of aqueous dimethylamine solution of 16 per cent. strength and 150 parts of water, the temperature rising to 35° C. After acidification with hydrochloric acid of 10 per cent. strength, the separated acid is filtered off with suction, washed with water, and dried. The acids named in the table may also be obtained in similar manner.

Example 2

3.45 parts of benzene-1-carboxylic acid-4-(N-dimethyl)-sulfamide are dispersed in 130 parts of anhydrous orthodichlorobenzene and 13 parts of thionylchloride and a small quantity of pyridine is added. After stirring for half an hour at 80-90° C. and for a quarter of an hour at 100-110° C., the excess of thionylchloride, including some parts of ortho-dichlorobenzene, is distilled off, for instance in a vacuum. After the addition at 100° C. of 5.15 parts of 1-amino-5-benzoylaminoanthraquinone and raising the temperature to 170-175° C., the whole is stirred for two hours at this temperature and kept boiling for another 15 minutes. Upon cooling the dyestuff

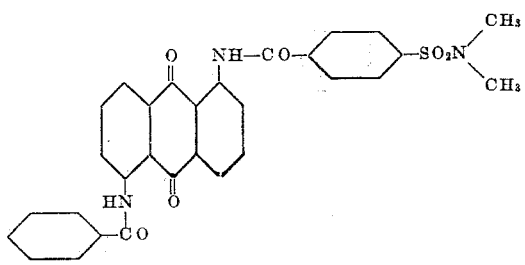

is obtained in very good yield in the form of little yellow needles which are filtered off, washed and dried. The 1-(4'-N-dimethylsulfamide-benzoylamino)-5-benzoylamino-anthraquinone dissolves in concentrated sulfuric acid to give an orange coloration, it melts at 313-315° C. and dyes cotton from a violet vat in very fast and pure yellow tints.

The same dyestuff may also be obtained by the reaction of 1-amino-5-nitroanthraquinone with 4-(N-diamethylsulfamide)-benzene-1-carboxylic acid chloride, reduction of the nitro group to the amino group and subsequent benzoylation. 1-amino-5-[$Bz_4$-(N)-dimethylsulfamide]-benzoylaminoanthraquinone can also be prepared by reacting 1-chloro-5-aminoanthraquinone with 4-(N-dimethylsulfamide)-benzene-1-carboxylic acid chloride, and condensing the product obtained with para-toluene-sulfamide and saponifying at room temperature with concentrated sulfuric acid.

By the reaction of 1-amino-5-benzoylaminoanthraquinone with sulamidebenzene-carboxylic acids named in the following table and by working as prescribed in the first paragraph hereof, dyestuff of the following properties are obtained:

| Sulfamidebenzene-carboxylic acid | Dyestuff Color—$H_2SO_4$ | Dyeing on cotton after soaping |
|---|---|---|
| (a) Benzene-1-carboxylic acid-3-(N-dimethyl)-sulfamide. | orange | yellow. |
| (b) Benzene-1-carboxylic acid-4-(N-phenyl)-sulfamide. | ---do------ | Do. |
| (c) Benzene-1-carboxylic acid-4-(N-methylphenyl)-sulfamide. | ---do------ | greenish yellow. |
| (d) Benzene-1-carboxylic acid-4-(N-methyl)-sulfamide. | orange-brown. | yellow. |
| (e) Benzene-1-carboxylic acid-4-(N-ethyl)-sulfamide. | ---do------ | greenish yellow. |
| (f) Benzene-1-carboxylic acid-4-(N-diethyl)-sulfamide. | ---do------ | yellow. |
| (g) 2-Chlorobenzene-1-carboxylic acid-4-(N-dimethyl)-sulfamide. | yellowish brown. | Do. |

Example 3

6.9 parts of benzene-1-carboxylic acid-4-(N-dimethyl)-sulfamide are dispersed in 195 parts of anhydrous ortho-dichlorobenzene and, after addition of 24 parts of thionylchloride, are stirred for half an hour at 80-90° C. and half an hour at 100-110° C. whereupon solution occurs. The excess of thionyl chloride together with some parts of orthodichlorobenzene are then distilled off, preferably in a vacuum, and hereafter 3.57 parts of 1:4-diamino-anthraquinone are added. To complete the reaction, stirring is carried on for 2 hours at 170-175° C. and for 15 minutes at the boil whereupon the dyestuff, on cooling, separates completely in red-brown needles. These are filtered, washed with alcohol, and dried. The 1:4-di-(4'-N-dimethylsulfamide-benzoylamino)-anthraquinone, which is obtained in very good yield, dissolves in concentrated sulfuric acid to give an orange coloration and dyes cotton from a blue vat in red tints.

If, in this example, 1:4-diaminoanthraquinone is replaced by 1:5-diaminoanthraquinone, a dyestuff is obtained which dissolved in concentrated sulfuric acid to give a yellow coloration and which dyes cotton from a dark vat in yellow tints.

If, in the first paragraph of this example, benzene-1-carboxylic acid-4-(N-dimethyl)-sulfamide is replaced by benzene-1-carboxylic acid-4-(N-methyl-phenyl)-sulfamide, orange-colored prisms of 1:4-di-(4'-N-[methylphenyl]-sulfamide-benzoylamino)-anthraquinone melting at 292-294° C. are obtained.

Example 4

2.57 parts of benzene-1-carboxylic acid-4-(N-diethyl)-sulfamide are dispersed in 200 parts of anhydrous ortho-dichlorobenzene and 8 parts of thionylchloride as well as a very small quantity of pyridine are added. After stirring for half an hour at 80-90° C. and half an hour at 100-110° C., the excess of thionyl chloride including some parts of ortho-dichlorobenzene is distilled off in the vacuum. After the addition of 3.4 parts of 4-aminoanthraquinone-2:1-(N)-1':2'-(N)-benzacridone and raising the temperature to 170-175° C., stirring is carried on for two hours at this temperature and the whole is finally maintained at the boil for a quarter of an hour. On cooling, the dyestuff of the formula

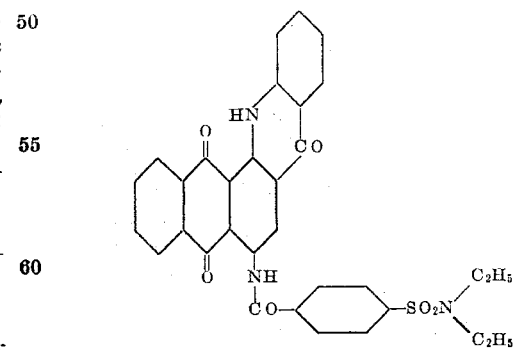

separates in very good yield to form dark crystals, which are filtered off, washed and dried. The 4-($Bz_4$-[N-diethyl]-sulfamide-benzoylamino)-anthraquinone-2:1-(N)-1':2'-(N)-zenzacridone dissolves in concentrated sulfuric acid to give an orange coloration, it melts at 247-250° C. and dyes cotton from a red-violet vat in greenish blue tints.

If benzene-1-carboxylic acid-4-(N-dimethyl)-sulfamide is used instead of benzene-1-carboxylic acid-4-(N-diethyl)-sulfamide, a similar dyestuff is obtained.

*Example 5*

At first, 1-amino-4-(Bz₄-[N-dimethyl]-sulfamide-benzolamino)-anthraquinone is prepared by reacting 1-nitro-4-aminoanthraquinone with para-(N-dimethyl)-sulfamide-benxoic acid chloride and reducing the nitro group, and 1-chloro-4-(Bz₄-[N-diethyl] - sulfamide - benzoylamino) - anthraquinone is prepared by reacting 1-chloro-4-aminoanthraquinone with para-(N-diethyl)-sulfamidebenzoic acid chloride.

2.25 parts of 1-amino-4-(Bz₄-[N-dimethyl]-sulfamide - benzoylamino) - anthraquinone, 2.5 parts of 1-chloro-4-(Bz₄-[N-diethyl]-sulfamide-benzoylamino)-anthraquinone, 0.6 part of sodium carbonate and 0.05 part of copper acetate are heated, while stirring, in 30 parts of nitrobenzene in the course of three hours to 200° C. and stirring is then continued for another five hours at 200–205° C. Partially already while hot, but completely upon cooling, the 4-(Bz₄-[N-dimethyl]-sulfamide-benzoylamino) - 4' - (Bz₄-[N-diethl]-sulfamide-benzoylamino)- 1:1'-dianthrimide of the formula

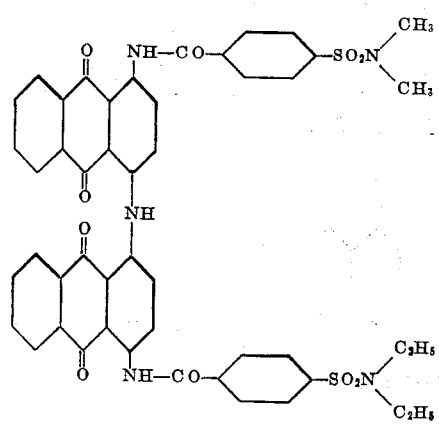

separates to form little olive-colored needles, dissolving in concentrated sulfuric acid to give a green coloration and dyeing cotton from a red-violet vat in fast gray tints.

A similar dyestuff is obtained by condensing in nitrobenzol, according to the process described in the second paragraph, 1-chloro-4-(Bz₄-[N-diethyl] - sulfamide - benzoylamino)-anthraquinone and 1-amino - 4 - (Bz₄ - [N - diethyl] - sulfamide- benzoylamino)-anthraquinone.

When the dyestuffs of paragraphs 2 and 3 hereof are stirred with monohydrate or with sulfuric acid of about 98 per cent strength, dyestuffs giving brown-olive dyeings are obtained by after-oxidizing with nitrite or dichromate.

*Example 6*

2 parts of 4-(Bz₄-[N-diethyl]-sulfamide-benzoylamino)-4'-benzoylamino - 1:1 - dianthrimide are dissolved at a temperature of 8° C. in 36 parts of monohydrate and then stirred at a temperature of 16–20° C. for 16 hours. The solution is poured into ice water, while stirring, and hereafter 0.6 part of sodium nitrite in aqueous solution is added drop by drop and the whole is stirred for 16 hours. The dyestuff obtained is filtered off, washed until neutral and stirred with water to make a paste. It probably corresponds to the formula

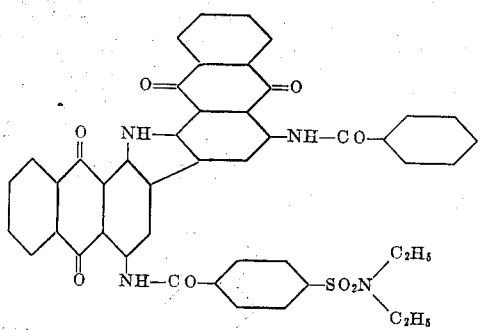

and dissolves in concentrated sulfuric acid with red to red-brown coloration and dyes cotton from a red-brown vat in fast olive tints, and their fastness to water drops and ironing, superior to that of the known dyestuff which is free of sulfamide groups, is worth mentioning.

The 4-(Bz₄-[N-diethyl] - sulfamide - benzoylamino)-4'-benzoylamino-1:1'-dianthrimide, used according to the first paragraph hereof and which dyes cotton in gray tints, is formed by condensation in nitrobenzene in the presence of small quatities of a catalyst (for example copper powder or copper salts) at raised temperature, of 1-chloro - 4 - benzoylaminoanthraquinone and 1-amino-4-(Bz₄-[N-diethyl]-sulfamide - benzoylamino)-anthraquinone (which can be produced from 1-amino-4-nitroanthraquinone and benzene-1-carboxylic acid chloride-4-(N-diethyl)-sulfamide and subsequent reduction.

When, instead of 4 - (Bz₄ - [N - diethyl] - sulfamide-benzoylamino)-4'-benzoylamino-1:1' - dianthrimide, 4 - (Bz₄ - [N - methyl - phenyl]-sulfamide-benzoylamino)-4'-benzoylamino-1:1' - dianthrimide is stirred with sulfuric acid of 97–98 per cent. strength, an olive-brown dyestuff is obtained.

*Example 7*

15 parts of 4-(Bz₄-[N-dimethyl]-sulfamide-benzoylamino)-4'-benzoylamino - 1:1'-dianthrimide are introduced at a temperature of 5° C. into 360 parts of monohydrate and then stirred for 16 hours at a temperature of from 5 to 100° C. The whole is then poured into ice water while stirring and 5 parts of sodium nitrite in aqueous solution are added drop by drop and the mixture is stirred for 10 hours at 0–16° C. The dyestuff obtained is filtered off, washed until neutral and stirred with water to make a paste. It dissolves in concentrated sulfuric acid to give a red coloration and dyes cotton from a brown to vat fast olive tints.

The 4-(Bz₄-[N-dimethyl]-sulfamide - benzoylamino)-4'-benzoylamino - 1:1' - dianthrimide is obtained by the condensation in nitrobenzene in the presence of catalysts, and at raised temperature, of 1-chloro-4-benzoylaminoanthraquinone and 1 - amino-4-(Bz₄-[N-dimethyl] - sulfamide-benzoylamino)-anthraquinone (which can be prepared from 1-amino - 4 - nitroanthraquinone and benzene-1-carboxylic acid-4-(N)-dimethyl-sulfamide and subsequent reduction).

*Example 8*

20 parts of 4-(Bz₄-[N-dimethyl]-sulfamide-benzoylamino)-5'-benzoylamino - 1:1'-dianthrimide are poured into 360 parts of monohydrate at a temperature of 5° C. and then stirred for 16 hours at a temperature of from 5 to 10° C. After pouring into ice-water, 6 parts of sodium nitrite as aqueous solution are added in the course of one hour and stirring is continued for another 16 hours at a temperature of 0–16° C. The dyestuff obtained is filtered off, washed until neutral and stirred with water to make a paste. It dissolves in concentrated sulfuric acid to give a red-violet coloration and dyes cotton from a brown vat in pure, fast, red-brown tints. Probably it corresponds to the formula

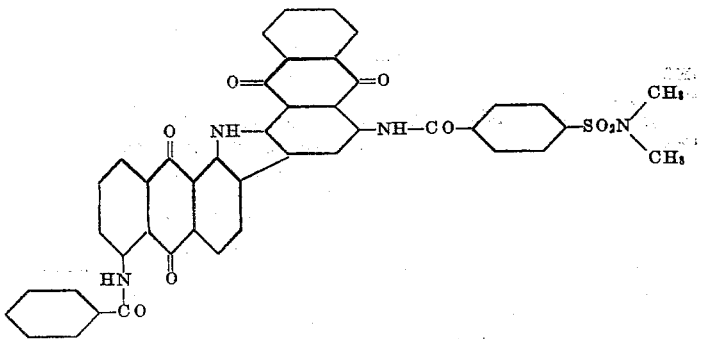

The dianthrimide used in this example may be obtained from 1-amino-4-(Bz4-[N-dimethyl]-sulfamide-benzoylamino)-anthraquinone and 1-chloro-5-benzoylaminoanthraquinone.

Carbazolation may also take place at room temperature.

Similar dyestuffs are obtained when 4-(benzoyl-amino)-5'-(Bz4-[N-dimethyl]-sulfamide-benzoylamino)-1:1'-dianthrimide or 4:5'-di-(Bz4-[N-dimethyl]-sulfamide-benzoylamino)-1:1'-dianthrimide are stirred with monohydrate or sulfuric acid of a high percentage strength and is after-oxidized with nitrite or dichromate.

Example 9

4.5 parts of 1-amino-5-(Bz4-[N-dimethyl]-sulfamide-benzoylamino)-anthraquinone (cf. Example 2, paragraph 2), 1.4 part of 2.6-dichloroanthraquinone, 1.1 part of sodium carbonate and 0.3 part of copper acetate are heated in 36 parts of nitrobenzene in the course of three hours to 200° C. and the temperature is maintained at 200–210° C. for six hours. Brown-red crystals of the dyestuff of the formula

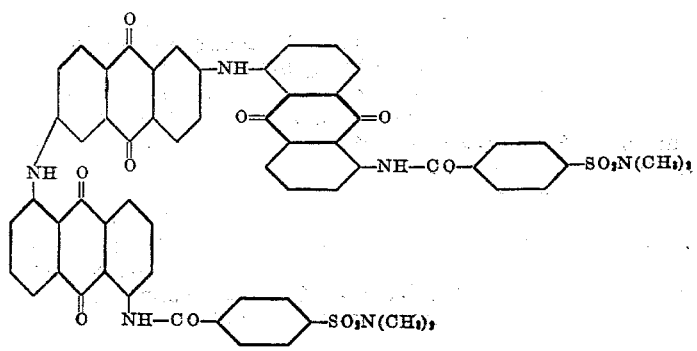

are obtained which dissolves in concentrated sulfuric acid with green to green-olive coloration and dyes cotton from an olive-brown vat in fast Bordeaux tints.

Example 10

7.1 parts of 1-amino-5-(Bz4-[N-dimethyl]-sulfamide-benzoylamino)-anthraquinone (cf. Example 2, paragraph 2) and 1.5 part of anhydrous pyridine are dispersed in 130 parts of ortho-dichlorobenzene. After heating the mixture to 150–160° C. a solution of 1.1 part of oxalylchloride in 65 parts of ortho-dichlorobenzene is added drop by drop while stirring and the whole is heated to the boil for one hour. There follow cooling, filtering off, washing with ortho-dichlorobenzene, washing with alcohol and drying. The dyestuff of the formula

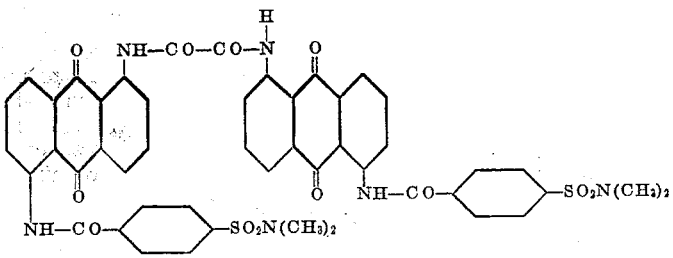

is a yellow powder, dyeing cotton from a green vat in strong yellow tints.

Example 11

3.7 parts of finely pulverized terephthalic acid, about 0.2 part of anhydrous pyridine and 10 parts of thionylchloride are dispersed in 267 parts of ortho-dichlorobenzene and heated to 160–180° C. for such length of time as is necessary for the terephthalic acid to dissolve. After distilling off the excess of thionylchloride and cooling to 18 to 22° C., 5 parts of finely pulverized 1-aminoanthraquinone and 1.8 part of anhydrous pyridine are added and the mixture is stirred for 16 hours at a temperature of 18 to 22° C. After that, the mixture is heated for one hour to 100° C. and a few more minutes to the boil and 10 parts of 1-amino-5-(Bz4-[N-dimethyl]-sulfamide- benzoylamino) - anthraquinone (cf. Example 2, second paragraph) are added and heating to the boil is continued for another hour. After cooling there follow filtering off, washing with orthodichlorobenzene, washing with alcohol and drying. A yelolw powder of the formula

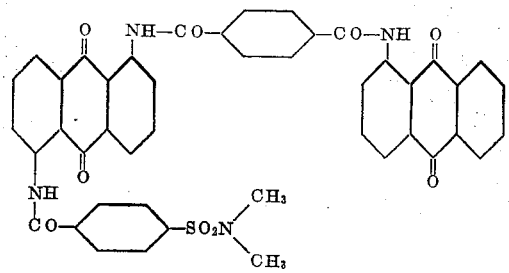

is obtained which dyes cotton from a black-violet vat in yellow tints.

ride the whole is stirred for 1½ hours at 80° C. The solution is then mixed with 44.9 parts of 1-amino-4-[para- (N-dimethyl) - sulphonamido-benzoylamino]-anthraquinone, and the whole is stirred for 2 hours at 120–130° C. The dyestuff which crystallises in the form of dark red crystals upon cooling is separated by filtering with suction, well washed with boiling alcohol and dried. The dyestuff dissolves in concentrated sulphuric acid with an orange-brown coloration, and dyes cotton from a blue-violet vat fast bluish red tints.

In an analogous way some products of the general formula

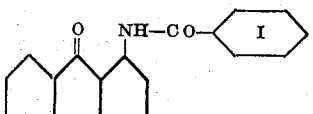
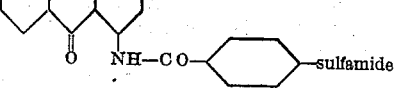

can be made as shown by the following table.

| Substituents in the Ring I | Sulphonamido-group | Coloration in concentrated sulphuric acid | Colour of the vat | Colour of the soaped dyeing on cotton |
|---|---|---|---|---|
| 4-Methoxy | Sulphodimethyl amide | greenish | violet | pink. |
| 4-Iodo | do | brown | do | Do. |
| 2-Chloro | do | red | do | orange. |
| 2:4-Dichloro | do | do | do | Do. |
| 4-Phenyl | do | do | blue-violet | Do. |
| 4-Cyano | do | brown | do | pink. |
| 3:4:5-Trimethoxy | do | red | green-blue | Do. |
| 4-Chloro | Sulphomorpholide | brown | violet | red-orange. |
| 4-Fluoro | Sulphodimethyl amide | red | blue | pink. |
| 3:4-Dichloro | do | do | violet | orange-red. |
| 3-Methoxy | do | do | blue | orange. |
|  |  | do | violet | orange tinged pink. |
| 4-Phenylsulphone | do | red-orange | green-grey | yellowish-pink. |
| 4-Methylsulphone | do | orange | blue-green | scarlet. |
| 4-Sulphodiethylamide | do | do | black-violet | yellowish-pink. |
| 4-Methyl | do | red | violet | pink. |
| 3,4-Methylenedioxy | do | brown-orange | do | Do. |
| 4-Phenoxy | do | brownish | do | Do. |

Example 12

4.6 parts of benzene-1-carboxylic acid-4-(N-dimethyl)-sulphonamide and 3.1 parts of thionyl chloride are suspended in 48 parts of nitrobenzene, and the whole is stirred for 2 hours at 120–130° C., whereupon dissolution occurs. 7.6 parts of 1-amino-4-(para-chloro-benzoylamino)-anthraquinone are added, and the whole is maintained at 120–130° C. for 2½ hours while stirring. The dyestuff, which is obtained in a very good yield, commences to precipitate while the mixture is warm, precipitation is completed by cooling, and the precipitate is separated by filtration. The latter is then washed with nitrobezene followed by alcohol. The product forms small yellow-red crystals which dissolve in concentrated sulphuric acid with a red-brown to red coloration, and dye cotton fast scarlet tints from a grey-blue vat. The dyestuff is well suited for printing by the usual potash process.

Practically the same dyestuff is obtained by condensing 1-amino-4-[para-(N-dimethyl)-sulphonomadiobenzoylamino]-anthraquinone with para-chloro-benzoyl chloride.

A dyestuff yielding somewhat more yellowish scarlet tints is obtained by using benzene-1-carboxylic acid 4-(N-diethyl)-sulphonamide, instead of benzene-1-carboxylic acid 4-(N-dimethyl)-sulphonamide.

Example 13

17.5 parts of naphthalene-β-carboxylic acid are dispersed in 300 parts of dry nitrobenzene, and after the addition of 15 parts of thionyl chlo- The 1-amino-4-(para-methyl-benzoylamino)-anthraquinone is obtained in the following manner: 28 parts of para-toluic acid are dispersed in 700 parts of nitrobenzene, and after the addition of 65 parts of thionyl chloride and a very small quantity of pyridine, the whole is stirred at 80–90° C. for 2 hours. 134 parts of very pure 1-amino-4-nitro-anthraquinone are then added, and the whole is stirred for a further 3 hours at 120–130° C. Upon cooling, the acylated 1-amino-4-nitro-anthraquinone is obtained in the form of small handsome yellow needles. The nitro-group is then reduced. The reduction product forms small violet needles when recrystallised from ortho-dichlorobenzene.

The 1-(para-phenoxy-benzoylamino)-4-aminoanthraquinone is obtained, for example, in the following manner: 32.1 parts of very pure para-phenoxy-benzoic acid are dispersed in 200 parts of dry nitrobenzene, and, after the addition of 23 parts of thionyl chloride, the whole is stirred for 1½ hours at 70–80° C. The whole is then mixed with 40.2 parts of 1-amino-4-nitro-anthraquinone, and stirred for a further 2 hours at 120–130° C. The small yellow needles which precipitate upon cooling are separated by filtering with suction, washed well with hot water and dried. The nitro-group is reduced by the usual methods. When recrystallised from ortho-dichlorobenzene 1-(para - phenoxy - benzoylamino)-4-amino-anthraquinone forms small violet crystals.

Example 14

48 parts of benzene-1-carboxylic acid-4-(N- dimethyl)-sulphonamide are dispersed in 1500 parts of anhydrous ortho-dichlorobenzene, and, after the addition of 150 parts of thionyl chloride and a small quantity of pyridine, the whole is maintained for ½ hour at 90-100° C. while stirring. The excess of thionyl chloride and some ortho-dichlorobenzene are then removed by distillation under reduced pressure, 74 parts of a mixture of 1-amino-4-benzoylamino-6-chloranthraquinone, and 1-amino-4-benzoylamino-7-chloranthraquinone are added, and the temperature is slowly raised to the boil while stirring. After cooling, the dyestuff which crystallises in the form of red needles is separated by filtration, washed with hot alcohol, and dried. The resulting dyestuff, which is obtained in good yield, dissolves in concentrated sulphuric acid with a red coloration and dyes cotton from an olive vat very fast bright bluish-red tints. Especially remarkable is the excellent fastness to light of the dyeings.

Instead of ortho-dichlorobenzene, another solvent may be used such as nitro-benzene or tri-chlorobenzene. The above mentioned mixture of 1 - amino - 4 - benzoylamino - 6 - chloranthraquinone and 1-amino-4-benzoylamino-7-chloranthraquinone is obtained in the following manner: A mixture of 1-amino-6-chloranthraquinone and 1-amino-7-chloranthraquinone, such as is obtained by nitrating anthraquinone-β-sulphonic acid followed by chlorination and reduction, is converted into a mixture of 1-amino-4-nitro-6-chloranthraquinone and 1-amino-4-nitro-7-chloranthraquinone in the manner described in the case of the pure 6-chloro-derivative in Example 3 of United States Patent No. 2,134,654. 15 parts of the mixture of 1-amino-4-nitro-chloranthraquinones are dispersed in 150 parts of dry ortho-dichlorobenzene, and, after the addition of 15 parts of benzoyl chloride, the whole is boiled while stirring for 3 hours. After cooling the mixture, filtering, and washing the filter residue with alcohol, the yellow benzoylamino-bodies so obtained are dispersed in 7 times their weight of ortho-dichlorobenzene, then mixed with twice their weight of phenylhydrazine, and the whole is stirred for 1 hour at 130-140° C. After cooling, filtering, and washing the filter residue with alcohol, the amino bodies so obtained crystallise in the form of violet needles.

In an analogous way some products of the formula

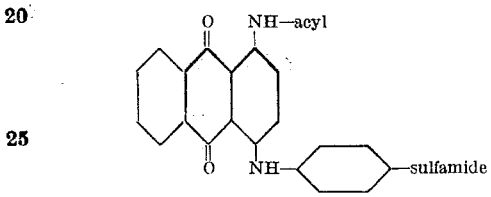

can be made as shown by the following table:

| Acyl-residue | Substitution in Ring II | Sulphonamide group | Coloration in concentrated sulphuric acid | Colour of the vat | Colour of the soaped dyeing on cotton |
|---|---|---|---|---|---|
| Benzoyl | 6/7-chloro | sulphodiethylamide | red-violet | violet | bluish pink. |
| Do | do | sulphodialylamide | do | olive | pink. |
| Do | do | sulphodibenzylamide | do | red-brown | Do. |
| Do | 7-chloro | sulphopiperidide | do | olive-green | Do. |
| Do | 6-chloro | sulphomorpholide | do | violet | bluish pink. |
| Do | 6/7-chloro | do | do | violet | pink. |
| Do | 6-chloro | sulphomethylphenylamide | violet-red | blue-violet | bluish pink. |
| Do | 6/7-chloro | do | do | blue-violet | pink. |
| 4-chloro-benzoyl | 7-chloro | sulphodimethylamide | red | violet | Do. |
| Do | 6-chloro | do | violet-red | do | bluish pink. |
| 4-bromo-benzoyl | 7-chloro | do | brown-red | olive | brownish pink. |
| 4-phenyl-sulphone-benzoyl | do | do | red | blue-green | pink. |
| Do | 6-chloro | do | violet-red | blue-green | orange-red. |
| 4-iodo-benzoyl | 7-chloro | do | brown | green-olive | bluish-pink. |
| Do | 6-chloro | do | do | green-olive | Do. |
| 4-chloro-benzoyl | 6/7-chloro | sulphopiperidide | red-violet | olive-green | pink. |
| 3:4:5-trimeth-oxybenzoyl | 6-chloro | sulphodimethylamide | brown-orange | olive | red. |
| 4-fluoro-benzoyl | do | do | red-violet | brown-olive | bluish-pink. |
| 4-phenoxybenzoyl | 6/7-chloro | do | brown-orange | violet | Do. |
| 4-chlorobenzoyl | do | sulphodiethylamide | red-violet | green-blue | pink. |
| 4-cyanobenzoyl | 6-chloro | sulphodimethylamide | red | green | Do. |
| 3-methoxybenzoyl | do | do | red-violet | green-blue | bluish-pink. |
| Cinnamoyl | do | do | orange-brown | blue-green | bluish-red. |
| 4-methoxybenzoyl | do | sulphomorpholide | brown | violet | bluish-pink. |
| benzoyl | do | sulphodimethylamide | red | green | bluish-red. |
| Do | 7-chloro | do | do | greenish | red. |
| 4-bromobenzoyl | 6-chloro | do | red-violet | olive | blusih-red. |
| 4-chlorobenzoyl | 6/7-chloro | do | do | green-blue | pink. |
| benzoyl | do | sulphopiperidide | do | olive | bluish-pink. |
| Do | 6-chloro | do | do | do | Do. |
| 4-methoxybenzoyl | do | sulphodimethylamide | brownish | olive-brown | blue-red. |
| Do | 6/7-chloro | do | brownish orange tinged red | do | Do. |
| 4-sulphodimethylamidobenzoyl | 6-chloro | do | brownish | blue-green | pink. |

The above mentioned mixture of 1-amino-4-[Bz4 - (N - dimethyl) - sulphonamide - benzoylamino]-6-chloranthraquinone and 1-amino-4-[Bz4 - (N - dimethyl) - sulphonamidobenzoylamino]-7-chloranthraquinone is prepared in the following manner: 12 parts of benzene-1-carboxylic acid 4-(N-dimethyl)-sulphonamide are dispersed in 170 parts of dry ortho-dichlorobenzene, and, after introducing 30 parts of thionyl chloride and a very small quantity of pyridine, the whole is stirred for ½ hour at 90–100° C. The excess of thionyl chloride and some orthodichlorobenzene are then removed by distillation under reduced pressure, 15 parts of the mixture of 1-amino-4-nitro-6-chloranthraquinone and 1-amino-4-nitro-7-chloranthraquinone described in Example 1 are added, and the temperature is slowly raised to the boil while stirring. After cooling, filtering and washing the filter residue with alcohol, the yellow compounds so obtained are reduced with phenylhydrazine in the manner described in Example 1.

The above mentioned 1-(para-bromobenzoylamino)-4-amino-6-chloranthraquinone is obtained in the following manner: 80.5 parts of para-bromobenzoic acid are dispersed in 800 parts of dry nitrobenzene, and after the addition of 60 parts of thionyl chloride and a very small quantity of pyridine, the whole is stirred at 90–100° C. for 2 hours. The solution is then mixed with 121 parts of 1-amino-4-nitro-6-chloranthraquinone, and the whole is stirred for 3 hours at 120–130° C. After cooling, filtering, and washing the filter residue with hot alcohol, the resulting yellow nitro-body is reduced by one of the usual methods. The resulting 1-(para-bromobenzoylamino)-4-amino-6-chloranthraquinone forms violet needles when recrystallised from orthodichlorobenzene.

The above mentioned benzoic acid-4-sulphopiperidide is obtained in the following manner:

11 parts of benzene-1-carboxylic acid-4-sulphochloride are slowly added at room temperature to a solution of 17 parts of piperidine in 150 parts of water while stirring. The whole is then powerfully stirred for 2 hours at 50° C., allowed to cool, filtered and the filtrate is mixed with dilute hydrochloric acid until it has a strongly acid reaction. The precipitate which is formed is separated by filtration, washed with dilute hydrochloric acid and water, and dried at 100° C. When recrystallised from alcohol it forms colourless needles.

The above described 1-(para-methoxy-benzoylamino)-4-amino-6-chloranthraquinone is obtained in the following manner:

31 parts of para-methoxybenzoic acid are dispersed in 350 parts of dry nitrobenzene and after the addition of 30 parts of thionyl chloride and a very small quantity of pyridine the whole is stirred at 80–90° C. for 2 hours. 60 parts of 1-amino-4-nitro-6-chloranthraquinone are then added, and the whole is stirred for a further 3 hours at 120–130° C. Upon cooling, the acylated amino-anthraquinone crystallises in the form of small yellow needles. The nitro-group is reduced with phenyl-hydrazine in the manner described in Example 1. The reduction product forms small red-violet needles when recrystallised from ortho-dichlorobenzene.

Example 15

70 parts of finely pulverised benzene-1-carboxylic acid-4-(N)-diethanol-sulfamide (obtained by reacting at room temperature 11 parts of benzene-1-carboxylic acid-4-sulfochloride with 21 parts of diethanoldiamine in 150 parts of water) are suspended in 2000 parts of dry o-dichlorobenzene, 100 parts of thionylchloride and about 1 part of pyridine are added and the temperature is raised with good stirring and with reflux cooling to 130° C. and kept about one hour at 120–130°. Then the excess of thionyl chloride and some o-dichlorobenzene is distilled off under reduced pressure. To the solution which now contains the benzene-1-carboxylic acid chloride-4-N-di-β-chloroethylsulfamide of the formula

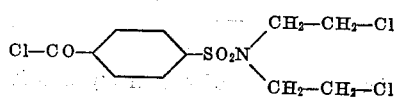

82 parts of 1-amino-5-benzoylaminoanthraquinone are added and the temperature is raised to 170° C. Finally the reaction mixture is boiled for 10 minutes and allowed to cool. The dyestuff which separates is filtered, washed with hot ethyl alcohol and ether. It forms golden-yellow needles, dissolves in conc. sulfuric acid with red color and dyes cotton from a reddish violet vat fast and pure yellow shades.

The corresponding dyestuff made from 1-amino-4-benzoylaminoanthraquinone forms red needles dissolving in sulfuric acid with red color and dyeing from a brownish violet vat bluish red shades.

Example 16

2 parts of the dyestuff obtained according to Example 1, paragraph 1, are well stirred with 300 parts of water and 8 parts by volume of caustic soda solution of 36° Bé. and reduced at about 30° C. by the addition of 4 parts of sodium hydrosulfite. This stock vat is added to a dyebath which contains 7 parts by volume of caustic soda solution of 36° Bé. and 4 parts of sodium hydrosulfite in 2700 parts of water. 100 parts of cotton are entered into the dyebath at 25° C. and 75 parts of common salt are added 15 minutes later. Dyeing is carried out for one hour at 25–30° C. The cotton is then squeezed, oxidized in the air, rinsed, acidified, rinsed again, and soaped at the boil.

If, in similar manner, two parts of the dyestuff obtained according to Example 6, paragraph 1, are used, reduction may be carried out at about 60° C. and dyeing at about 40 to 50° C. to dye the cotton in an olive tint.

This application is a continuation-in-part of our application Serial No. 605,632, filed July 17, 1945, now abandoned.

What we claim is:

1. A vattable compound selected from the group consisting of α-aroylamino-anthraquinones, α-aroylamino-dianthrimides and the corresponding carbazoles, α-aroylamino-trianthrimides and α-aroylamino-anthraquinone acridones, wherein at least one aroyl radical is the radical of a benzene carboxylic acid which carries a sulfonic acid amide group as substituent in the benzene radical in a position which is not adjacent to the carboxyl group.

2. A vat dyestuff selected from the group consisting of α-aroylamino-anthraquinones, α-aroylamino-dianthrimides and the corresponding carbazoles, α-aroylamino-trianthrimides and α-aroylamino-anthraquinone acridones, wherein at least one aroyl radical is the radical of a benzene carboxylic acid which carries a sulfonic acid amide group as substituent in the benzene radical in a position which is not adjacent to the carboxyl group.

3. A vat dyestuff as claimed in claim 2 wherein said aroyl radical corresponds to the formula

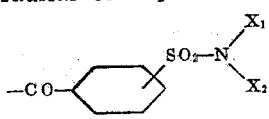

wherein

stands for a member of the group consisting of

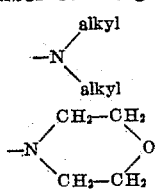

and

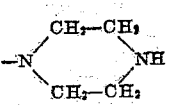

the alkyl radicals containing at the most 7 carbon atoms.

4. Anthrimide-carbazoles of the general formula

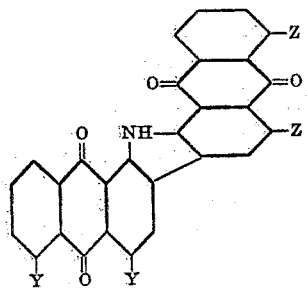

wherein one of the substituents Y stands for hydrogen and the other for a benzoylamino group and one of the substituents Z stands for hydrogen and the other for the grouping

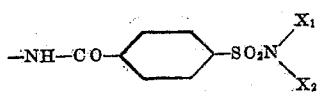

wherein $X_1$ and $X_2$ each stands for an alkyl radical containing up to 4 carbon atoms.

5. The anthrimide-carbazole of the formula

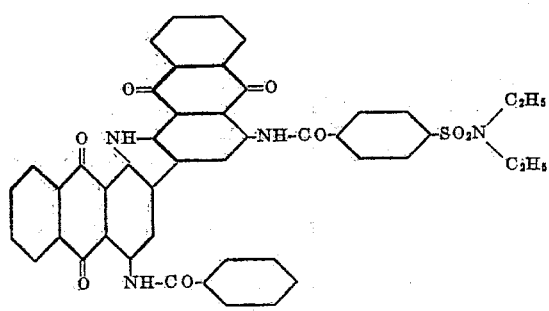

6. A vat dyestuff of the type which contains only one anthraquinone skeleton and two acylamino groups in 1 and 4 positions thereof wherein at least one acyl radical is the radical of an aryl carboxylic acid which carries a sulfonic acid amide group as substituent in the aryl nucleus in a position which is not adjacent to the carboxyl group.

7. A vat dyestuff of the type which contains only one anthraquinone skeleton and two acylamino groups in 1 and 4 positions thereof wherein at least one acyl radical is the radical of a benzene carboxylic acid which carries a sulfonic acid amide group as substituent in the aryl nucleus in a position which is not adjacent to the carboxyl group.

8. A vat dyestuff of the general formula

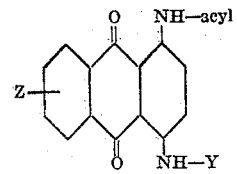

wherein Y stands for a p-N-dialkylsulfamide benzoyl radical and Z stands for a member of the group consisting of hydrogen and a halogen.

9. A vat dyestuff of the formula

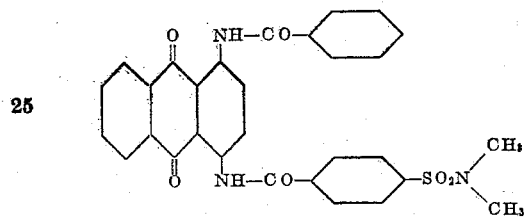

10. The vat dyestuff of the formula

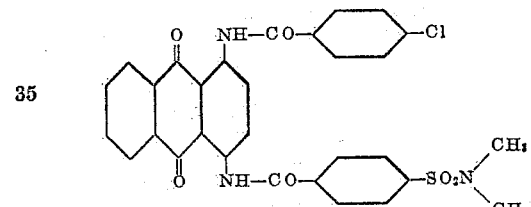

11. The vat dyestuff of the formula

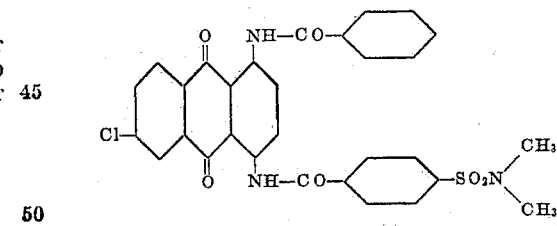

12. Process for the manufacture of vat dyestuffs comprising reacting with carbazolizing agents anthrimides of the general formula

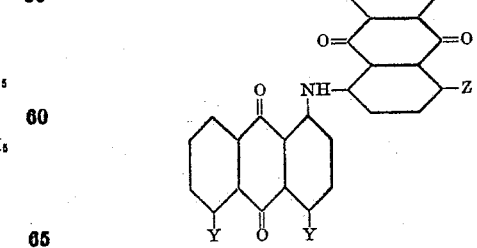

wherein one of the substituents Y stands for hydrogen and the other for a benzoylamino group and one of the substituents Z stands for hydrogen and the other for the grouping

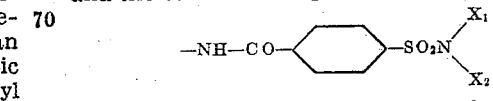

wherein $X_1$ and $X_2$ each stands for an alkyl radical containing up to 4 carbon atoms.

13. A compound corresponding to the formula

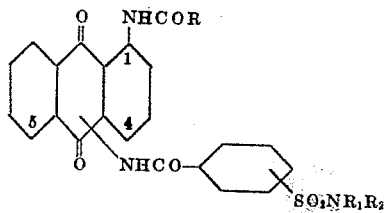

wherein R is selected from the group consisting of the phenyl radical and the radical

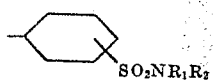

$R_1$ is a hydrocarbon radical, $R_2$ is selected from the group consisting of hydrogen and hydrocarbon radicals, the $-SO_2NR_1R_2$ group is in a position selected from the meta and para positions to the -NHCO- linkage, and the

group is in a position selected from the 4- and 5-positions on the anthraquinone nucleus.

WALTER KERN.
PAUL SUTTER.
THEODOR HOLBRO.

REFERENCES CITED

The following references are of record in the file of this patent:

UNITED STATES PATENTS

| Number | Name | Date |
|---|---|---|
| 2,190,751 | Zerweck | Feb. 20, 1940 |
| 2,275,013 | Graenacher | Mar. 3, 1942 |
| 2,356,060 | Irving | Aug. 15, 1944 |
| 2,377,145 | Gutzwiller | May 29, 1945 |